(12) United States Patent
Valentino

(10) Patent No.: US 6,302,547 B1
(45) Date of Patent: Oct. 16, 2001

(54) AUTOMATICALLY ADJUSTABLE PASSENGER MIRROR ASSEMBLY FOR A TRAILERED VEHICLE HAVING A MIRROR POSITION FEEDBACK AND POSITION CORRECTION DEVICE

(76) Inventor: Joseph A. Valentino, 230 Sycamore Mills Rd., Media, PA (US) 19063

(*) Notice: Subject to any disclaimer, the term of this patent is extended or adjusted under 35 U.S.C. 154(b) by 0 days.

(21) Appl. No.: 09/309,509

(22) Filed: May 11, 1999

Related U.S. Application Data

(63) Continuation-in-part of application No. 08/769,005, filed on Dec. 18, 1996, now Pat. No. 5,953,167, which is a continuation-in-part of application No. 08/385,448, filed on Feb. 8, 1995, now Pat. No. 5,627,688.

(51) Int. Cl.⁷ .............................. G02B 5/08; G02B 7/182; B60R 1/06
(52) U.S. Cl. .......................... 359/843; 359/872; 359/877
(58) Field of Search ................................ 359/843, 872, 359/877

(56) References Cited

U.S. PATENT DOCUMENTS

| | | |
|---|---|---|
| 3,166,630 | 1/1965 | Esslinger . |
| 3,180,395 | 4/1965 | Reed . |
| 3,208,343 | 9/1965 | Prochnow . |
| 3,469,901 | 9/1969 | Cook et al. . |
| 3,563,639 | 2/1971 | Bowler . |
| 3,749,480 | 7/1973 | De Witt et al. . |
| 3,950,080 | 4/1976 | McKee et al. . |
| 4,609,265 | 9/1986 | McKee et al. . |
| 4,679,158 | 7/1987 | Tate . |
| 4,820,032 | 4/1989 | Thompson, Jr. . |
| 5,056,905 | 10/1991 | Jensen . |
| 5,132,851 | 7/1992 | Bomar et al. . |
| 5,196,965 | 3/1993 | Lang et al. . |
| 5,249,083 | 9/1993 | Doughtie et al. . |
| 5,541,778 | 7/1996 | DeFlorio . |
| 5,627,688 | 5/1997 | Valentino . |
| 5,719,713 | 2/1998 | Brown . |
| 5,835,291 | 11/1998 | Takayama . |
| 5,896,235 * | 4/1999 | Valentino ............... 359/843 |
| 5,912,616 | 6/1999 | Valentino . |
| 5,914,824 * | 6/1999 | Valentino ............... 359/872 |
| 5,953,167 * | 9/1999 | Valentino ............... 359/843 |
| 5,953,168 * | 9/1999 | Valentino ............... 359/840 |

FOREIGN PATENT DOCUMENTS

| | | |
|---|---|---|
| 0 094 817 | 5/1983 | (EP) . |
| 0 361 166A1 | 9/1989 | (EP) . |
| 2 601 634 | 7/1986 | (FR) . |
| 86 10279 | 3/1988 | (FR) . |
| 2 259 064 A | 3/1993 | (GB) . |
| 60161232 | 8/1985 | (JP) . |
| 86 05451 | 9/1986 | (WO) . |
| 95 35224 | 12/1995 | (WO) . |

OTHER PUBLICATIONS

"A Study of Commercial Motor Vehicle Electronics–Based Rear and Side Object Detection Systems," DOT HS 808 080 (Jan. 1994).

* cited by examiner

*Primary Examiner*—Ricky D. Shafer
(74) *Attorney, Agent, or Firm*—Finnegan Henderson Farabow Garrett & Dunner, L.L.P.

(57) ABSTRACT

An automatic mirror rotation assembly is provided for a vehicle having a tractor and semi-detached trailer. A control wheel is mounted in a structure connecting to a chassis of the tractor, and is raised into engagement with a lower surface of the trailer. As the vehicle turns, the rotation of the trailer with respect to the tractor is measured by counting rotations or partial rotations of the wheel against the underside surface of the trailer. A corresponding degree of passenger-side rear view mirror is calculated, and a motor automatically rotates the mirror. A mirror position feedback device measures the actual rotation of the mirror and feeds that information back to the assembly. A mirror position correction device automatically adjusts the mirror position when an actual mirror position differs from a desired mirror position.

5 Claims, 14 Drawing Sheets

AUTOMATICALLY ADJUSTABLE PASSENGER MIRROR ASSEMBLY FOR A TRAILERED VEHICLE HAVING A MIRROR POSITION FEEDBACK AND POSITION CORRECTION DEVICE

This application is a continuation in part of U.S. application Ser. No. 08/769,005, filed on Dec. 18, 1996, now U.S. Pat. No. 5,953,167, which is a continuation in part of U.S. application Ser. No. 08/385,448, filed on Feb. 8, 1995, and issued as U.S. Pat. No. 5,627,688.

BACKGROUND OF THE INVENTION

1. Field of the Invention

The invention relates to an assembly for automatically rotating a vehicle rear view mirror. More specifically, the invention relates both to an assembly for automatically rotating a rear view mirror mounted on either side of a vehicle comprising a tractor hauling a semi-detached trailer, and to the rear view mirror itself.

2. Description of the Related Art

Trailered vehicles are well-known. Referring to FIG. 1a, a trailered vehicle 20 comprises a semi-detached trailer 22 mounted to a tractor 24. Trailer 22 is mounted at a hitching point 26, typically referred to as a "fifth wheel," positioned at a rear end 28 of the tractor's chassis 30. The tractor and trailer generally align to define an imaginary axis 32. A passenger-side rear view mirror 34 typically is mounted on a passenger-side door of the tractor, and positioned generally in alignment with the axis 32, so that the driver can see the passenger-side rear corner 36 of the trailer 22. The driver typically adjusts this passenger-side mirror 34 either electrically, or by hand, according to the length of the trailer 22. The driver's field of vision in the passenger-side mirror is depicted by reference numeral 38. The above-described relationship is shown in FIG. 1(a), depicting the right hand side as the passenger side, as is common for example in North America and continental Europe. Alternatively, a reversed relationship applies in other countries where the passenger side is on the left hand side.

A problem occurs when the driver enters a turn, either going forward or reversing. As the tractor turns, the trailer pivots with respect to the tractor, forming an angle therebetween. The passenger-side rear view mirror, however, remains stationary. The trailer 22 therefore blocks the field of vision 38, causing the driver to lose sight of the passenger-side rear corner 36 of the trailer, along with any object in the vicinity. This problem is depicted in FIG. 1(b). Tighter turns obviously exacerbate this problem.

The resultant loss of rear visibility creates potentially dangerous situations. Whether driving on winding roads, or attempting to back the trailer into a parking lot or a loading dock, the driver's inability to see other vehicles, persons, or other objects in his passenger-side mirror can result in property damage or more serious accidents.

Reports published in 1994 indicate that out of 330,000 reported truck crashes in the U.S. in 1991, 19.1% of these accidents involved backing, turning, lane-changing, or merging maneuvers by trailered vehicles. These crashes accounted for 1.0% of all fatalities, 10.8% of injuries, and 6.3% of costs for trailered vehicle accidents that year, with total direct monetary losses estimated at over $250 million.

A number of commercially available warning systems exist that give a driver a warning of objects behind his truck during a turn. Despite the desirability of such systems, surveys of professional truck drivers have noted several shortcomings with the available systems. For example, existing devices are not easy to install. Another problem exists with the reliability of the existing systems, including damage to the systems while in use. Another problem is the difficulty of using the existing systems. In short, existing systems to detect and warn drivers of objects behind a truck have limited areas of coverage, provide inconsistent warnings, and rarely are used.

A better solution is to enable the driver to rely on his passenger-side rear view mirror by providing the mirror with the capability to rotate in response to a vehicle turn. Past attempts to provide such a device have met with limited success, as evidenced by the fact that no such device is in widespread use in the trucking industry.

An automatically adjustable passenger-side rear view mirror assembly is desired for trailered vehicles that is easy to install and operate, and is reliable under normal truck-driving conditions and environments.

Additional objects and advantages of the invention will be set forth in the description which follows, and in part will be obvious from the description, or may be learned by practice of the invention. The objects and advantages of the invention may be realized and obtained by means of the combinations described in the attached claims.

SUMMARY OF THE INVENTION

To achieve the foregoing objects, and in accordance with the purposes of the invention as embodied and broadly described herein, a mirror rotation assembly is provided for a vehicle having a tractor and a pivotally connected semi-detached trailer. The assembly comprises an apparatus supporting a rotatable control wheel, attachable to the tractor chassis proximate the fifth wheel. The control wheel support apparatus is configured to move the control wheel from a disengaged position proximate the chassis, to an engaged position with the wheel in rolling contact with an underside of the trailer. A counting means is provided that is operable to count a number of rotations or partial rotations of the wheel as the trailer pivots with respect to the tractor during a vehicle turn. A motor connects to a rotatable mirror on the tractor. A control means also is provided, programmed to receive the number of wheel rotations or partial rotations from the counter, calculate a degree of vehicle turn corresponding to the number of wheel rotations or partial rotations, calculate a degree of mirror rotation corresponding to the degree of vehicle turn, generate a signal indicating a desired mirror position.

In one preferred embodiment, the control wheel support apparatus includes a mounting block having a groove defined therein, a slider block slidably mounted in the groove, the control wheel mounted on the slider block, and a spring for biasing the slider block upward so that the control wheel engages the underside of the trailer.

In another embodiment, the control wheel support mechanism includes an arm that pivots upward until the control wheel engages the underside of the trailer.

Other structures capable of supporting the control wheel, and bringing the control wheel into and out of engagement with the underside of the trailer are also possible.

It is preferred that the mirror include a position feedback device. The mirror position feedback device determines an actual mirror position and generates an actual mirror position signal indicating an actual mirror position.

It is further preferred that the mirror include a mirror position correction device. The mirror position correction device compares the actual mirror position signal from the mirror position feedback device to the calculated mirror position signal indicating a desired mirror position from the control means. The correction device then corrects the mirror position when the actual mirror position signal differs from the calculated mirror position signal.

DESCRIPTION OF THE DRAWINGS

Preferred embodiments of the present invention will be described in detail below with reference to the accompanying drawings. Together with the general description given above and the detailed description of the preferred embodiments given below, the drawings serve to explain the principles of the invention.

DESCRIPTION OF THE PREFERRED EMBODIMENTS

Reference will now be made in detail to the presently preferred embodiments of the invention as broadly illustrated in the accompanying drawings.

Figure 1A:
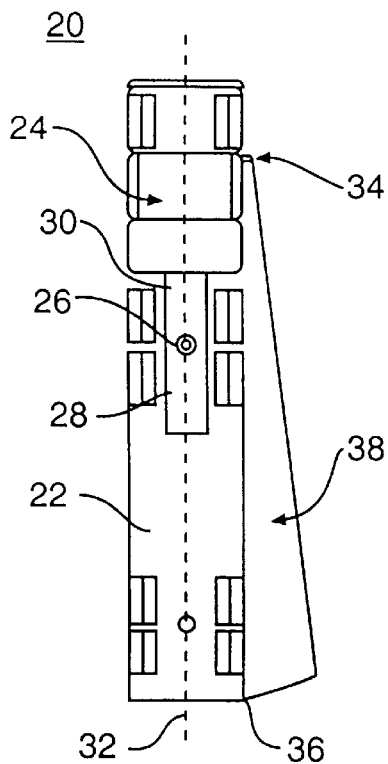
FIG. 1(a) is a top view of a trailered vehicle including a tractor and a semi-detached trailer, depicting the normal field of vision of a passenger-side rear view mirror.

A mirror rotation assembly is provided for a vehicle having a tractor and a pivotally connected semi-detached trailer. Referring to FIG. 1a, a vehicle 20 includes a trailer 22 which connects pivotally to a tractor 24 at a pivot point 26 commonly known in the trucking industry as the "fifth wheel." The fifth wheel 26 is positioned proximate a end 28 of tractor chassis 30. The tractor and trailer align to define an imaginary axis 32. A rear view mirror 34 is provided on the passenger-side door, to provide the driver a field of vision 38 encompassing the passenger-side rear corner 36 of the trailer. The overall configuration of a trailered vehicle, and the attachment between the trailer and the tractor, are well known and will not be described further.

Figure 2:
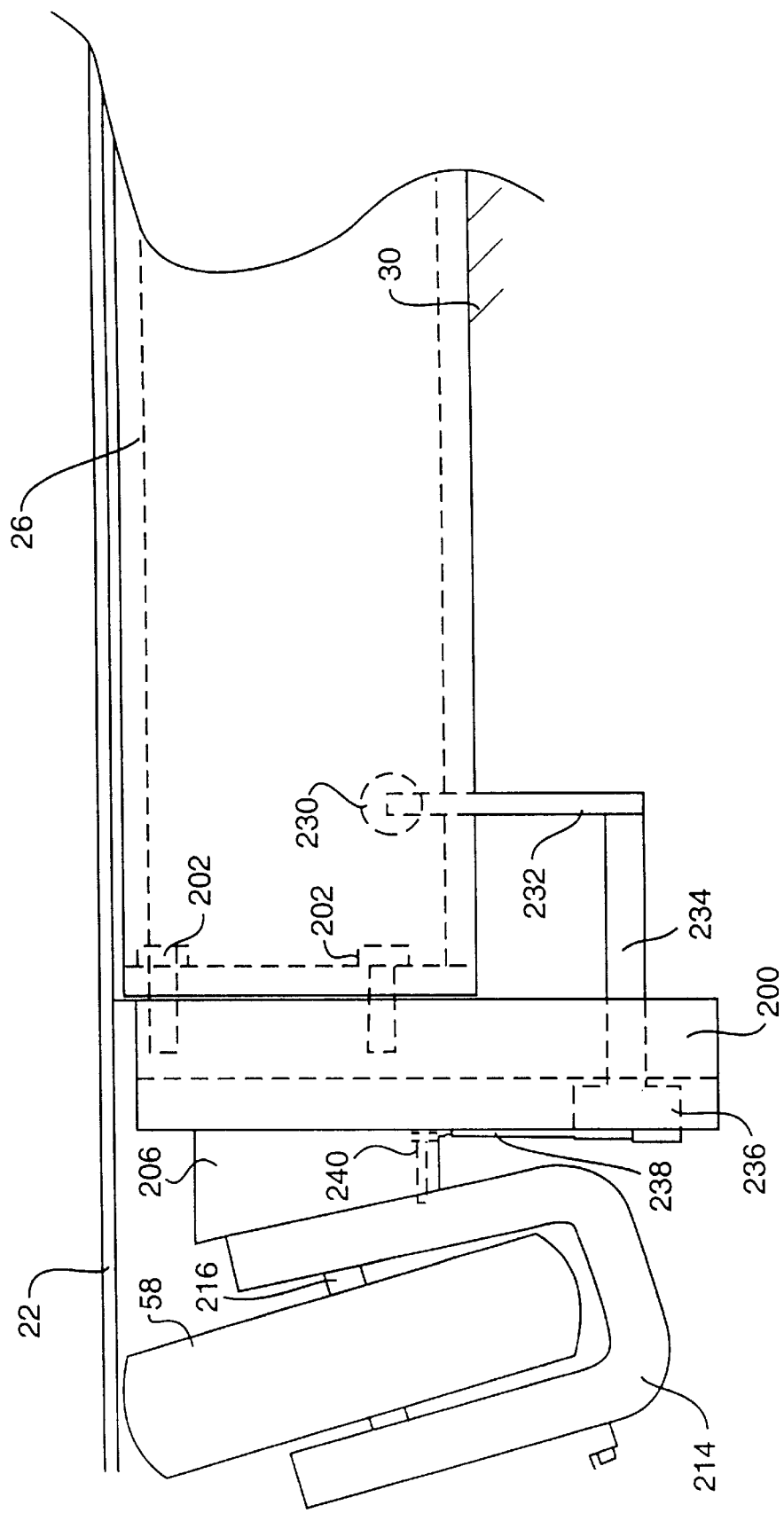
FIG. 2 is a side view of a first embodiment of a mirror rotation assembly according to the present invention.
Figure 4:
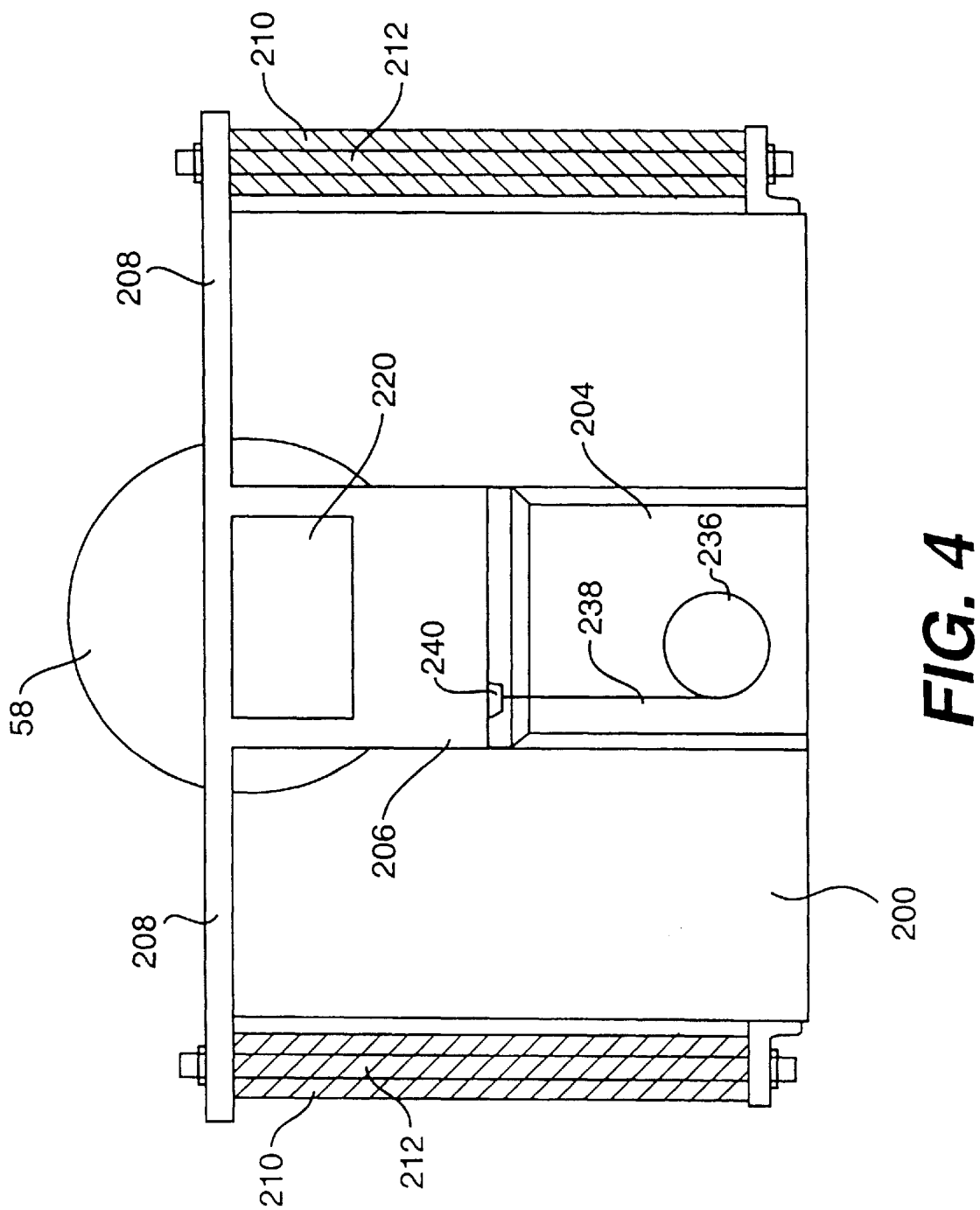
FIG. 4 is a front view of the first embodiment of a mirror rotation assembly shown in FIG. 2.

In accordance with a first embodiment of the invention, a mounting block is provided, attachable to the chassis, and having a groove defined therein. As shown in FIG. 2, a mounting block 200 attaches to tractor chassis 30 proximate a front end of fifth wheel 26. Preferably, mounting bolts 202 attach mounting block 200 directly to fifth wheel 26. In a preferred embodiment, mounting block 200 is made of a non-corrosive material, preferably aluminum, having approximate dimensions of 3"×3½". As shown in FIG. 4, a groove 204 is provided in mounting block 200.

Figure 3:
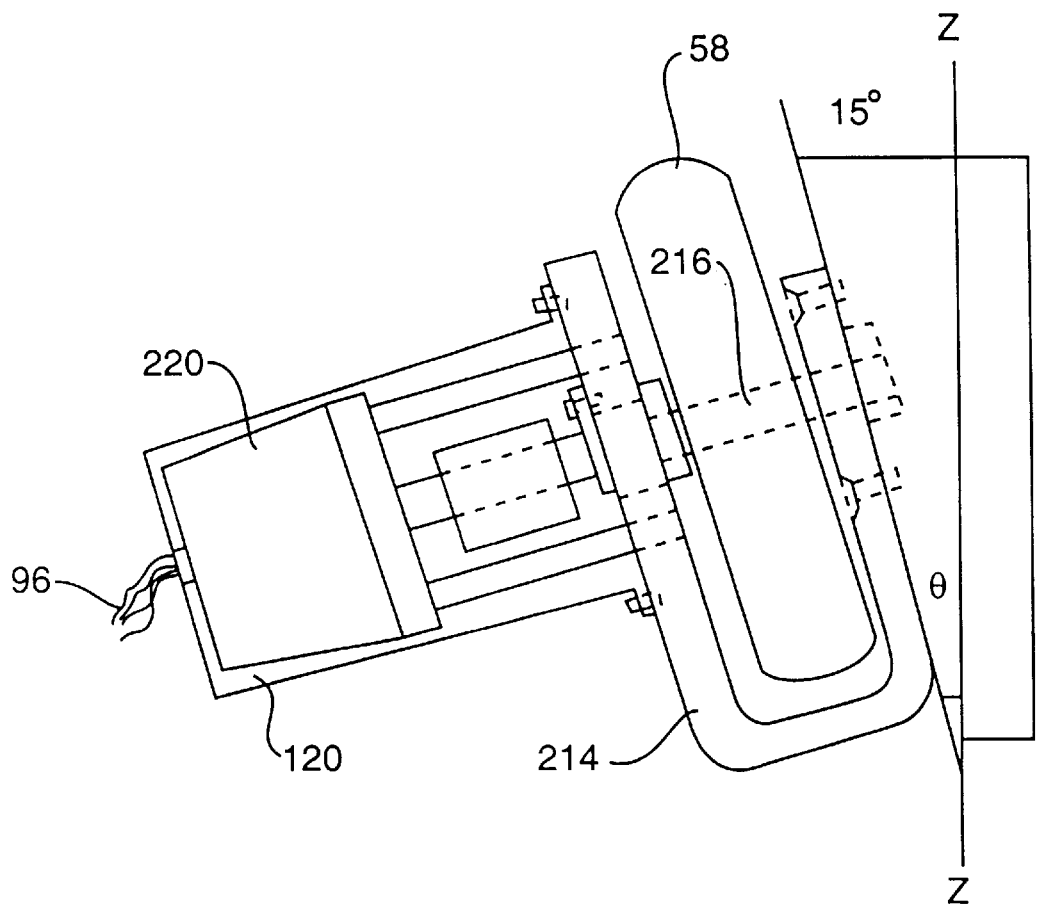
FIG. 3 is another side view of the first embodiment of a mirror rotation assembly shown in FIG. 2.

In accordance with the first embodiment of the invention, a control wheel is slidably supported in the groove. As shown in FIGS. 2–4, a slider block 206 slidably engages groove 204. Slider block 206 includes at least one, and preferably two, projecting arms 208. Projecting arms 208, and consequently slider block 206, are biased in an upward direction (as shown in FIG. 4) by coil springs 210 mounted on shafts 212. As shown in FIGS. 2 and 3, a generally U-shaped bracket 214 attaches to slider block 206, the bracket 214 supporting an axle 216. Control wheel 58 is rotatably supported on axle 216.

As noted above, coil springs 210 bias slider block 206 in an upward direction, thereby biasing control wheel 58 upward to an engaged position in contact with the bottom surface of trailer 22. The spring force of coil springs 210 should be adequate to maintain the control wheel 58 in engagement with trailer 22 despite jolts caused by irregularities in the road surface.

As embodied in FIGS. 2–4, control wheel 58 is mounted on U-shaped bracket 214 and axle 216 at a preselected angle θ with respect to a vertical line Z—Z drawn between the bottom surface of trailer 22 and the ground. It has been found that because control wheel 58 travels in an arc along the underside of trailer 22 when trailer 22 pivots, control wheel 58 can roll more easily if it is angled with respect to a vertical line, and therefore also with respect to the horizontal bottom surface of the trailer. The preferred angle θ of control wheel 58 with respect to vertical line Z—Z may be, for example, in a range of 5°–15° depending on the configuration of the vehicle. It is further preferred that the edge of control wheel 58, which will contact the underside surface of trailer 22 due to the 15° offset, be chamfered to increase the amount of wheel surface in contact with the trailer.

In accordance with the first embodiment of the invention, a counter is provided, operable to count a number of rotations or partial rotations of the control wheel as the trailer pivots with respect to the tractor during a vehicle turn. As shown in FIGS. 3 and 4, an electronic counting mechanism 220 is attached to slider block 206. Counter 220 is configured to count the rotations or partial rotations of wheel 58. Alternatively, wheel 58 can be fixed to a rotating axle 216, in which case counter 220 can be configured to count the rotations or partial rotations of axle 216. The number of rotations are translated into counts, which are transmitted via wires 96 to the control means, described below.

In accordance with the first embodiment of the invention, the control wheel is movable away from the bottom surface of the trailer when the trailer is disengaged from the chassis of the tractor. A sliding mechanism is provided with fifth wheel 26 for releasing the engagement between trailer 22 and tractor 24. The sliding mechanism may be constructed of a combination of a release lever, a shaft, and a rotating cam, as shown in FIG. 2, or a piston with a fluid cylinder (not shown), or any other equivalent mechanism. A release lever 230 is provided with fifth wheel 26 for releasing the engagement between trailer 22 and tractor 24. Preferably, a second release lever 232 is attachable to the fifth wheel release lever 230. Release lever 232 in turn attaches to a shaft 234, which is coupled to a rotating cam 236 on mounting block 200. A cable 238 extends between cam 236 and a cable set screw 240 bolted to slider block 206. When the driver operates the fifth wheel release lever 230, second release lever 232 turns shaft 234, which rotates cam 236. Rotation of cam 236 pulls cable 238, which in turn applies a downward force to slider block 206 against the upward bias of coil springs 210. The downward pull of cable 238 slides slider block downward along groove 204, thereby disengaging control wheel 58 from trailer 22, and moving control wheel 58 down away from trailer 22. This sequence functions to move the control wheel 58 clear of trailer 22, thereby avoiding the possibility of being damaged during disengagement of trailer 22 from tractor 24.

The first embodiment provides for sliding movement of slider block 206 in groove 204 of mounting block 200. To assist this sliding movement, a lubricant such as graphite may be inserted into groove 204. It would also be within the scope of the invention to provide bearings or wheels between slider block 206 and groove 204, to create a rolling motion. The mechanism to engage control wheel 58 to the bottom surface of trailer 22 may have different configurations, including configurations having a sliding motion, a rolling motion, or a pivoting motion, either by ways of a spring action, a pneumatic action, or any other. This invention covers all these mechanical configurations.

The invention is not limited to the use of a mounting block attachable to the chassis for pivoting the control arm to an engaged position. Rotation of the trailer is sensed by rotation of control wheel 58 against the bottom surface of the trailer as the trailer turns. Rotations of the control wheel 58 are then counted for later translation into a corresponding degree of trailer rotation. Hence, any structure capable of bringing the control wheel 58 into engagement with the bottom surface of the trailer falls within the scope of the present invention.

A second embodiment of a structure capable of engaging the control wheel with the bottom surface of the trailer is described below.

In the second embodiment of the invention, an elongated arm having first and second ends is provided. The first end is pivotally mountable to a support on the chassis of the tractor with the arm generally transverse to an axis defined by the tractor and the trailer. The second end supports a rotatable wheel. As broadly depicted in FIG. 5, a support 40 is attachable to a plurality of positions on the tractor chassis. Preferably, support 40 is a steel cross member 42 mountable to channels 29 in the chassis at a number of selected positions in front of fifth wheel 26, using steel hold down clamps 44, bolts 46, and neoprene gaskets 48. Clamps 44 preferably are steel clamps. The use of clamps and bolts to secure cross member 42 to chassis 30 allows the driver to loosen the bolts and move the cross-member 42 to the desired position, depending on the particular trailer being towed. One of ordinary skill in the art will recognize that most commercial trailers in the United States have a steel plate with holes in it mounted on the underside of the trailer, either 12 inches or 22 inches in front of the fifth wheel. The position of the cross member 42 on the chassis therefore should be adjustable as necessary to avoid holes in this plate. Neoprene gaskets 48 allow for variations in chassis surfaces.

Figure 5:
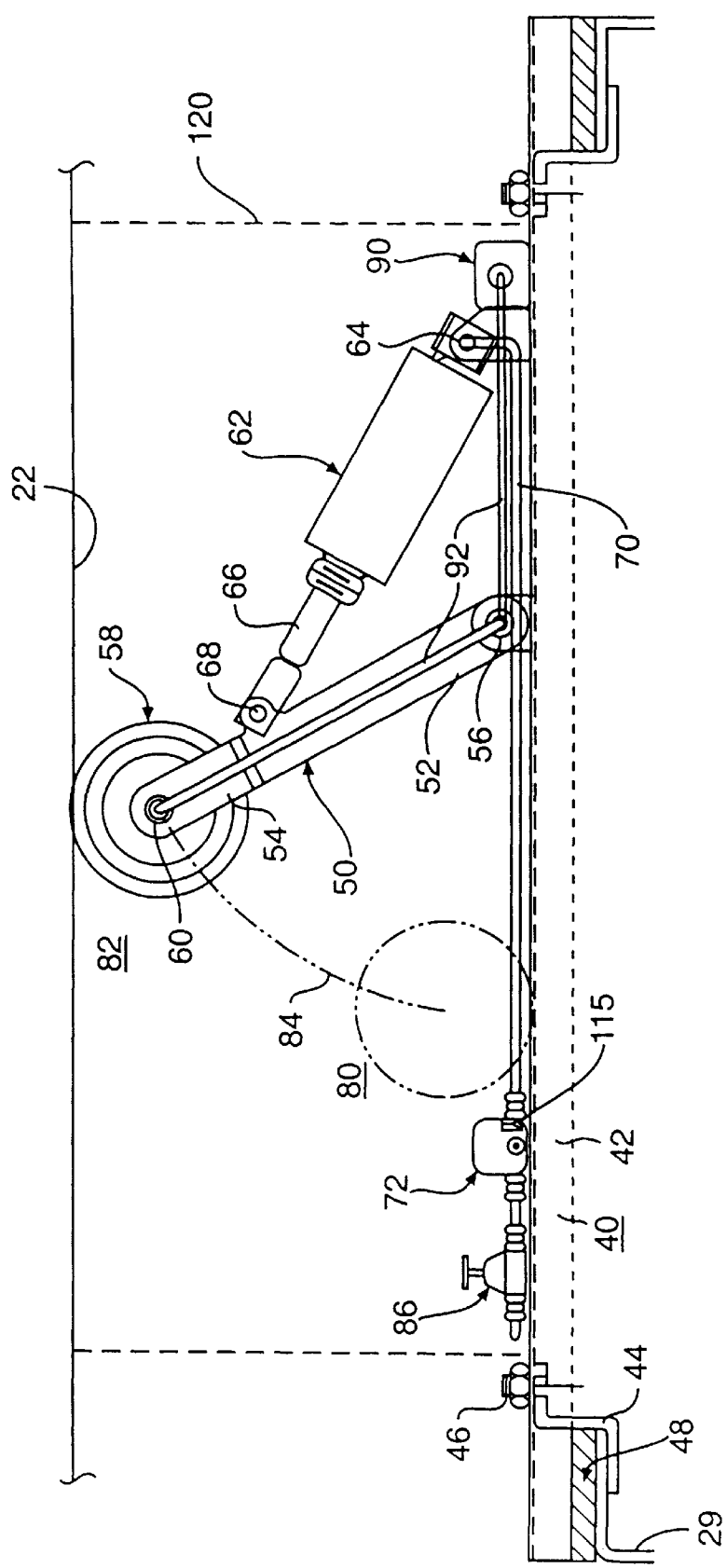
FIG. 5 is a side view of certain components of a second embodiment of a mirror rotation assembly according to the present invention.

As further broadly depicted in FIG. 5, an elongated control arm 50 has a first end 52 and a second end 54. First end 52 attaches pivotally to support 40 at pivot point 56. A control wheel 58, preferably including a molded rubber tire having a maximum capacity of 400 psi, is rotatably mounted at pivot point 60 at second end 54 of control arm 50.

In accordance with the second embodiment of the invention described above, a pivot assembly is provided to pivot the arm from a disengaged position proximate the chassis to an engaged position with the wheel in rolling contact with an underside of the trailer. As broadly depicted in FIG. 5, a cylinder 62, preferably a dual-action pneumatic cylinder, is pivotally connected to support 40 at pivot point 64. Piston rod 66 projects from cylinder 62, and is pivotally connected to control arm 50 at pivot point 68, intermediate first end 52 and second end 54.

As broadly embodied in FIG. 5, pressurized fluid is provided to actuate cylinder 62 via a fluid line 70. Preferably, 15 psig is supplied to cylinder 62 via the fluid line 70. In the preferred embodiment, the pressurized fluid is compressed air, preferably supplied by the vehicle's air compressor, via a solenoid control valve 72. This can be the same compressed air used in the vehicle brake system. However, it is within the scope of the invention to provide a separate pneumatic system to operate cylinder 62.

In accordance with the second embodiment of the invention, control arm 50 and cylinder 62 are positioned on support 40 so that when cylinder 62 is pressurized, control arm 50 will be pivoted upward from a disengaged position 80 proximate the chassis, to an engaged position 82 with wheel 58 in rolling contact with the underside surface of trailer 22. Moreover, in accordance with the invention, these components are positioned so that the arc 84 defined by the arm's motion from disengaged position 80 to engaged position 82 is transverse to the axis 32 defined by the aligned tractor and trailer. The reason for this positioning will be apparent from the description of the operation of the invention given below.

It is also preferable that when control arm 50 of the second embodiment is in the engaged position 82, wheel 58 be maintained in substantially continuous rolling contact with the underside of trailer 22. This feature of the invention takes into account normal road conditions, which will cause trailer 22 to move up and down as the vehicle wheels encounter bumps in the road. In order to help maintain this substantially continuous contact, a regulator 86 preferably is provided in fluid line 70 to adjust the pressure in cylinder 62 as necessary to adjust the position of control arm 50 and keep control wheel 58 in contact with trailer 22. Preferably, regulator 86 will operate to maintain substantially constant pressure in cylinder 62.

Figure 6:
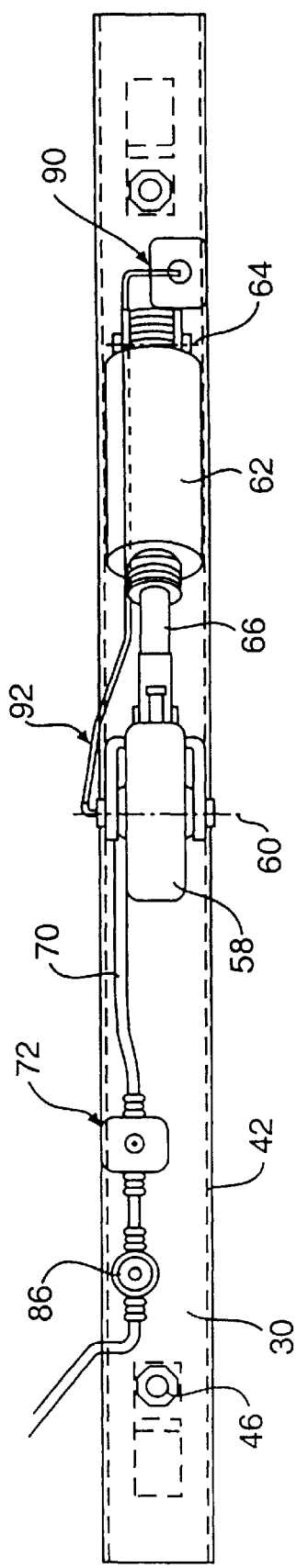
FIG. 6 is a top view of the embodiment of the mirror rotation assembly components depicted in FIG. 5.

In accordance with the second embodiment of the invention, a counter is provided, operable to count a number of rotations or partial rotations of the wheel as the trailer pivots with respect to the tractor during a vehicle turn. As broadly depicted herein, and referring to FIGS. 5 and 6, an electronic counting mechanism 90 is attached to support 42. A rotatable cable 92, preferably a standard flex drive cable, links counting mechanism 90 to control wheel 58. Cable 92 can be, for example, a standard speedometer cable covered with a plastic sheath. As wheel 58 turns in response to a turn of the vehicle and corresponding pivot by the trailer about pivot point 26, cable 92 rotates in correspondence. The rotations or partial rotations of cable 92 in turn are converted in counter 90 into electronic pulses. Counter 90 counts these electronic pulses.

Another option for counting rotations of wheel 58, not shown in the drawings, is to place windows in the wheel 58, and mount a counter with a visual scan capability proximate the wheel to count the windows as they rotate past the counter.

Figure 7:
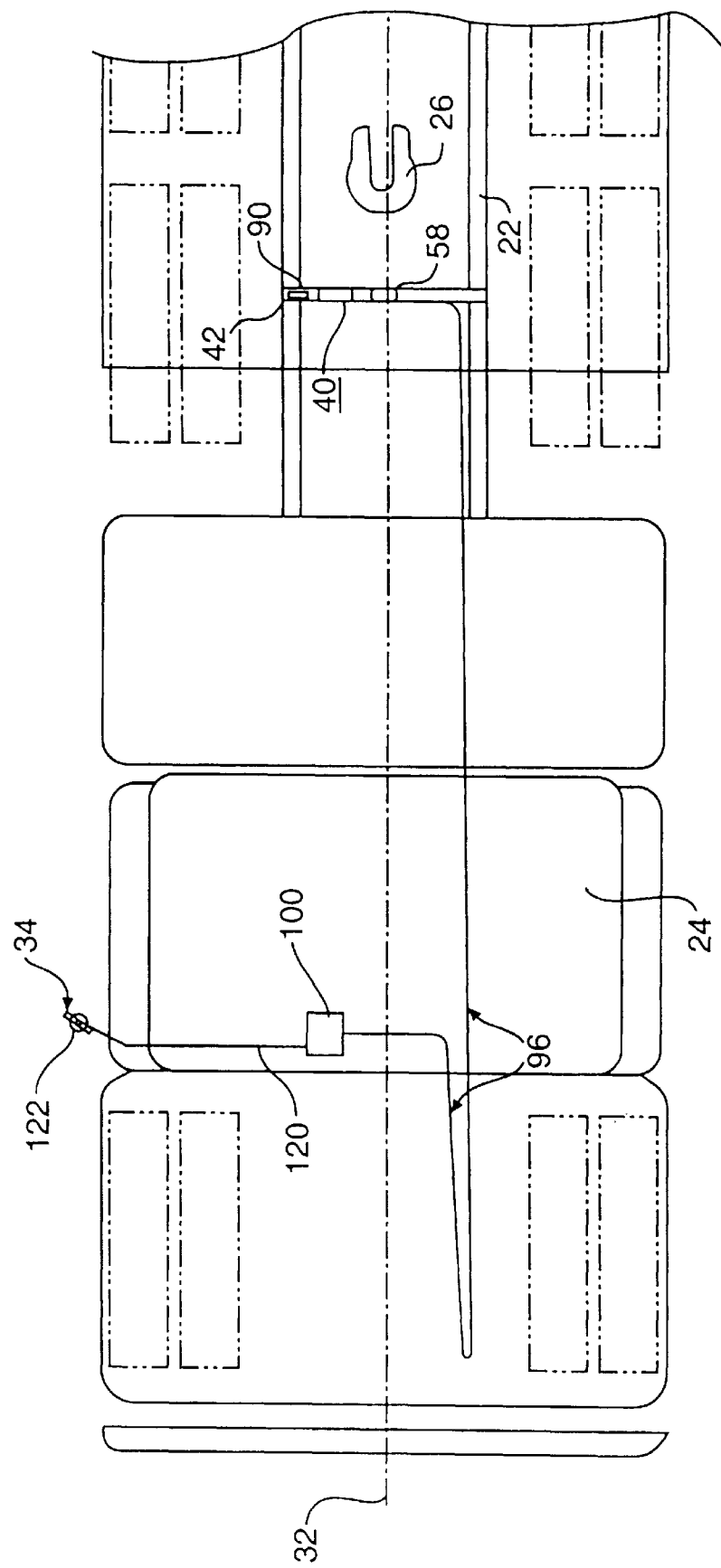
FIG. 7 is a top schematic view depicting the placement of a control means and wiring according to the present invention.
Figure 8:
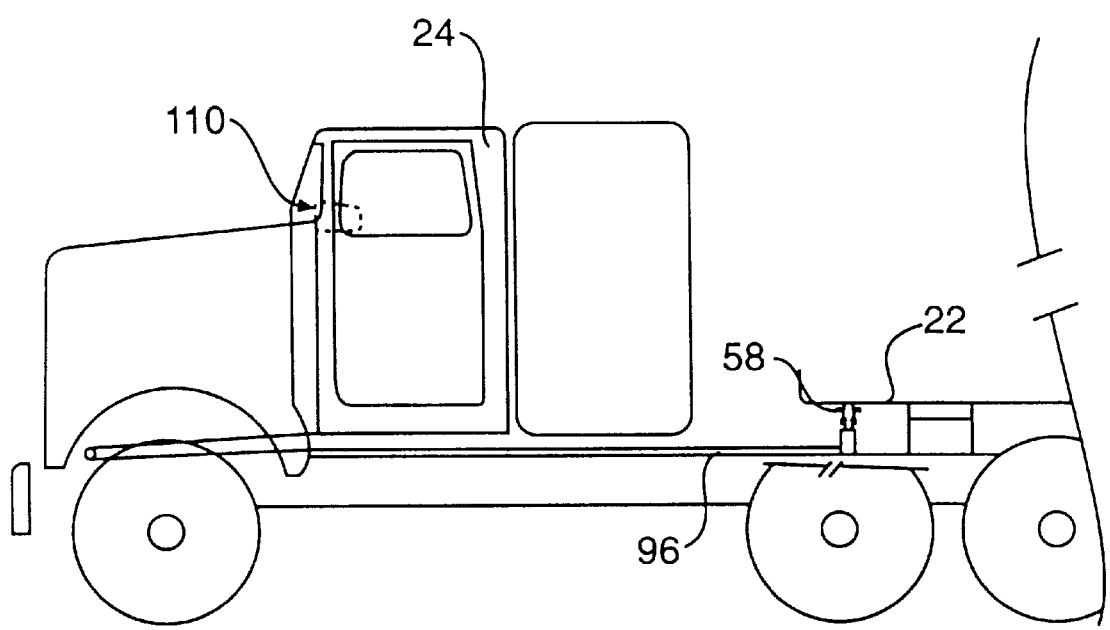
FIG. 8 is a side view of a vehicle tractor depicting placement of mirror rotation assembly components.

As broadly depicted in FIGS. 7 and 8, electronic counter 90 or 220 is connected electrically to a control means 100 with wire 96 mounted in the chassis 30 and running into the tractor 24. Electronic pulses from counter 90 or 220 travel via wire 96 to control means 100. Although a wire is shown and described, other modes of transmitting a signal from the counter 90 or counter 220 to control means 100 are also contemplated and fall within the scope of the invention. For example, a fiber optic cable, a radio transmitter, or other modes of signal transmission can be used.

In accordance with the invention, a motor is provided connectable to a rotatable mirror on the tractor, and the control means is programmed to receive the number of wheel rotations from the counter, calculate a degree of vehicle turn corresponding to the number of wheel rotations, calculate a degree of mirror rotation corresponding to the degree of vehicle turn, and instruct the motor to rotate the mirror according to the calculated degree of mirror rotation. As broadly depicted in FIGS. 7 and 8, control means 100, such as a computer processor, is connected via wire 96 to counter 90 or counter 220, and mounted within tractor 24. Processor 100 receives the electronic pulses from counter 90 or counter 220. Processor 100 is programmed to calculate a degree of vehicle turn corresponding to the number of wheel rotations (i.e., electronic pulses) received from counter 90 or counter 220. Processor 100 then calculates an amount of mirror rotation, corresponding to the degree of vehicle turn, necessary to maintain a view of the passenger-side rear corner 36 of the trailer 22 within field of vision 38.

Figure 9:
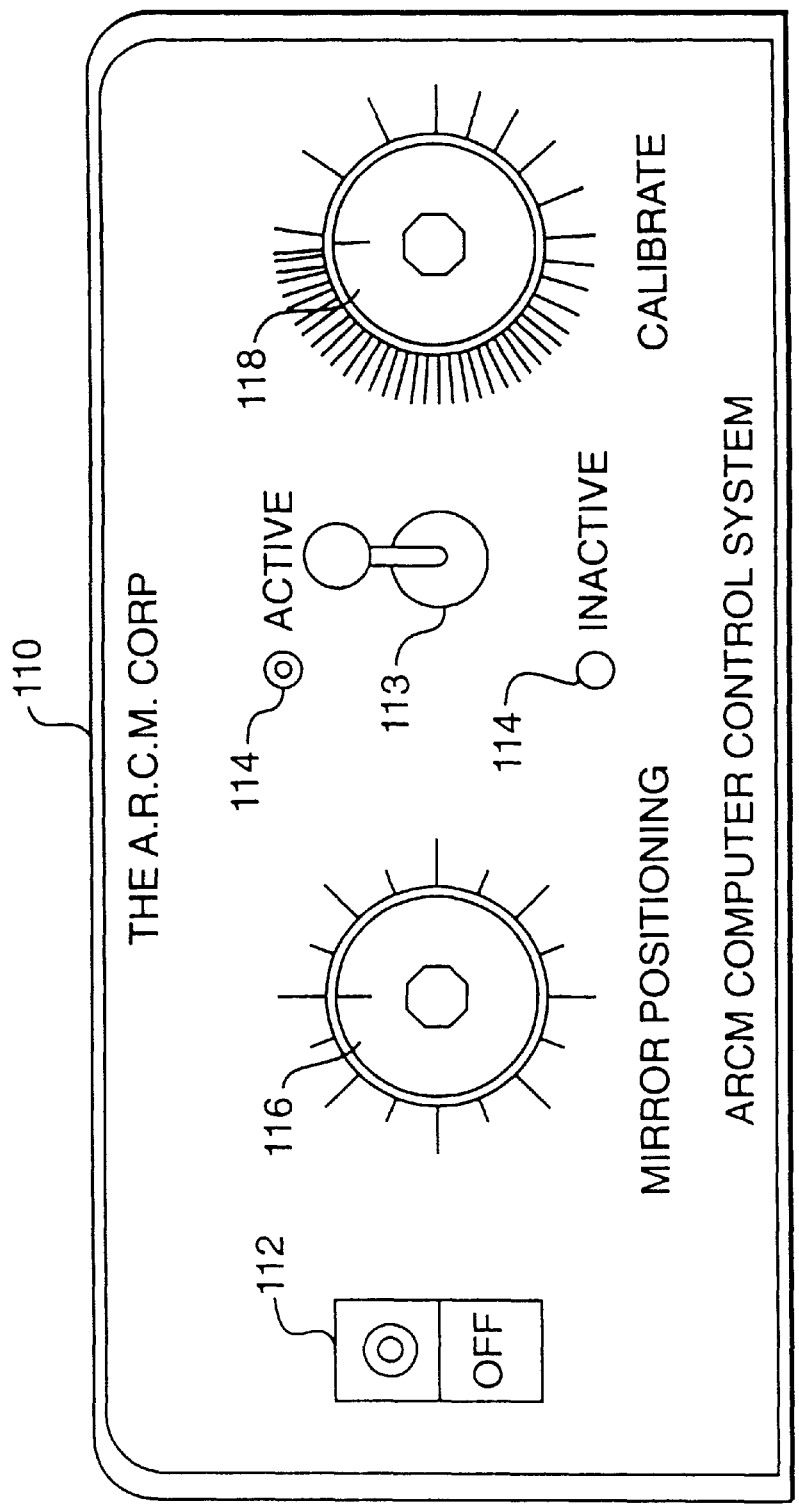
FIG. 9 is a front view of a control panel used with the present invention, located in the cab of the vehicle tractor.

In order for the system to operate effectively, certain information should be input to processor 100 prior to the vehicle turn. A control box 110, shown broadly in FIG. 9, preferably is mounted in the cab in a position allowing easy manipulation by the driver. In addition to an on/off switch 112, an active/inactive switch 113, and system indicia 114, control box 110 includes a mirror positioning control 116 and a calibration control 118. Power to control box 110 is supplied from the vehicle's normal 12V or 24V electrical system. The mirror positioning control 116 enables the driver to set the mirror 34 in the desired location to provide an acceptable field of vision 38, generally along an axis substantially parallel to axis 32. Calibration control 118 enables the driver to input the length of the trailer 22. Presetting the trailer length into the processor is critical to determine the proper amount of mirror rotation to retain an acceptable field of vision during the vehicle turn, because the amount of rotation needed will be a function of the trailer length.

Indicators 114 preferably include an "Active/Inactive", signal light to advise the driver when fluid pressure has been supplied to the cylinder and the control arm is engaged. The "Active" signal can be configured to light when pressure is supplied to the cylinder. It is preferred, however, that a limit switch 115, as shown in FIG. 5, be provided proximate solenoid control valve 72, activated by pressure when wheel 58 comes in contact with trailer 22, and deactivated when wheel 58 no longer contacts trailer 22, to provide the driver a positive indication that the system actually is engaged and capable of operating.

Preferably, processor 100 is connected electrically via wire 120 to a motor 122 in mirror assembly 34. As was the case with the connection between counter 90 and processor 100, wire 120 can be replaced with an optical fiber, a radio transmitter, or another signal transmitter well-known in the art.

Figure 10:
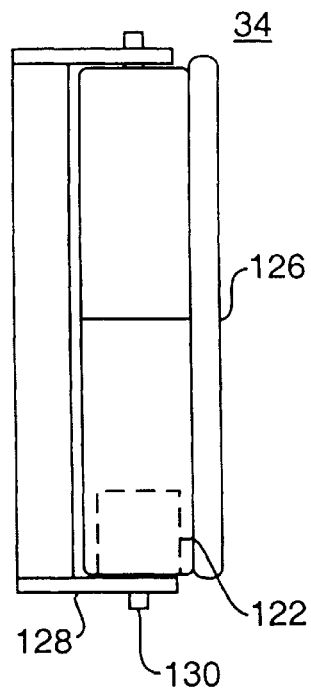
FIG. 10 is a side view of a mirror assembly used with the present invention.
Figure 11:
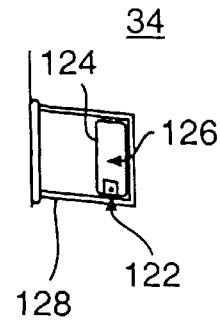
FIG. 11 is a front view of the mirror assembly shown in FIG. 10.
Figure 12:
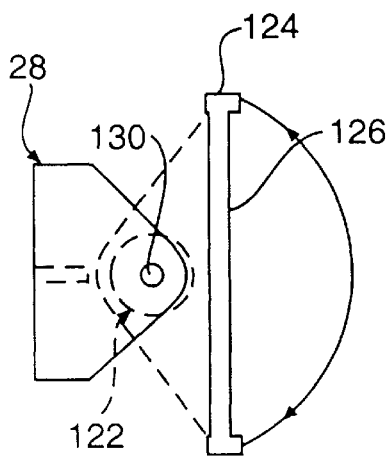
FIG. 12 is a top view of the mirror assembly shown in FIG. 10.

As broadly embodied in FIGS. 10 and 11, motor 122, preferably DC motor or a servo motor, is positioned within frame 124 of mirror assembly 34. Frame 124 and mirror face 126 are mounted pivotally on universal mounting bracket 128 and post 130. Motor 122 connects to mirror frame 124 via appropriate mechanical gearing and linkages (not shown), in order to rotate mirror frame 124 and face 126 about post 130.

Figure 13:
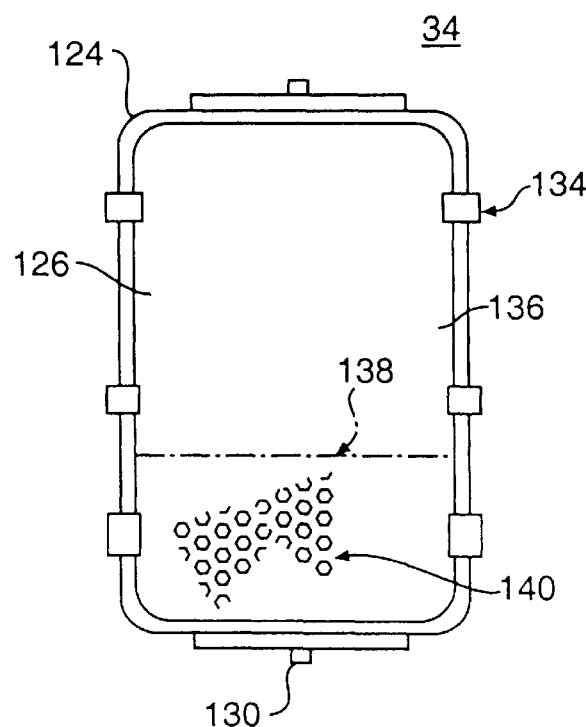
FIG. 13 is a detailed front view of a mirror assembly having a detachable mirror face, which can be used with the present invention.

It is further preferable that mirror assembly 34 be capable of providing varying optical capabilities to the driver. For this purpose, it is preferred that a plurality of clips 134 be provided in an opening of frame 124, and that a plurality of different mirror faces 126, each having different optical characteristics, e.g., a regular face mirror, a panoramic view mirror, a wide angle mirror, a convex mirror, a spot mirror, or the like, be provided. In addition, selected mirror faces 126 can have multiple optical characteristics. As broadly depicted in FIG. 13, mirror face 126 comprises an upper portion 136, a dividing line 138, and a lower portion 140. Upper portion 136 and lower portion 140 have different optical characteristics. The driver can select the mirror face 126 appropriate for the driving to be done, and easily insert or remove mirror faces 126 by opening and closing clips 134.

Figure 14:
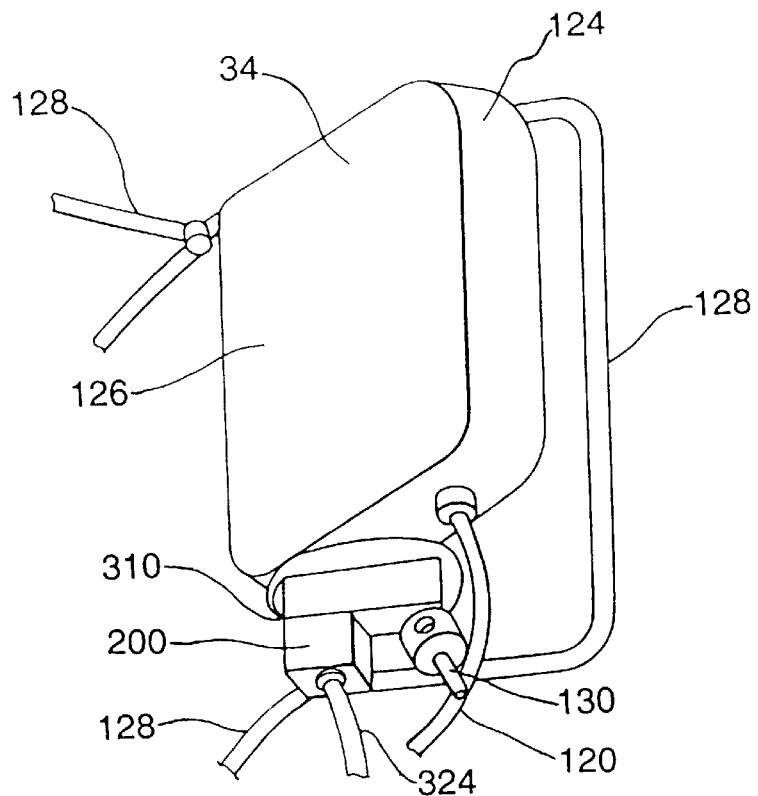
FIG. 14 is a perspective view of a mirror assembly with a position feedback device attached to the frame.
Figure 15:
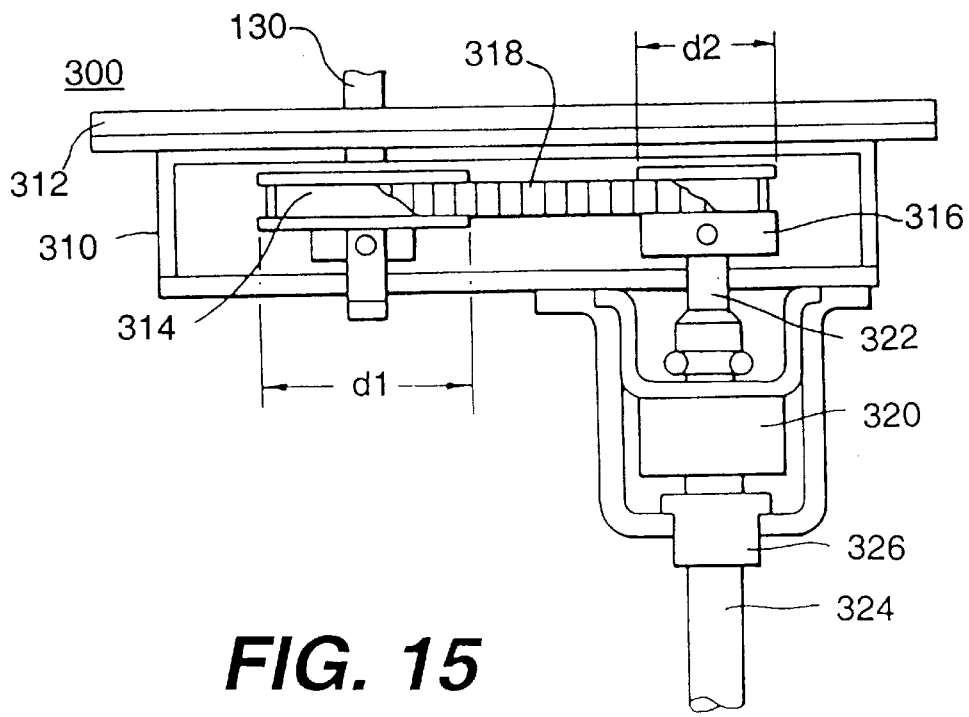
FIG. 15 is a cutaway side view of a mirror position feedback device in accordance with the invention.

The invention further comprises a mirror position feedback device 300, depicted in FIGS. 14 and 15.

The mirror position feedback device comprises a housing attachable to the frame of the mirror to be rotatable with the frame, the fixed shaft of the mirror projecting through the housing. Referring to FIGS. 14 and 15, a housing 310 is provided for housing the feedback components. The housing 310 preferably is open at the top, and includes a plastic or rubber seal 312 around the periphery of the opening. The housing preferably is configured to attach to frame 124 of the mirror on the bottom side, with fixed shaft 130 projecting through the housing 310. Because of this connection, the housing 310 will rotate with mirror frame 124 about the fixed shaft 130.

The mirror position feedback device further comprises a first pulley supported in the housing and fixedly attached to the fixed shaft. As shown in FIG. 15, a first pulley 314 is supported inside housing 310, and attached fixedly to fixed shaft 130. When attached, first pulley 314 will not rotate with the mirror frame 124 and housing 310. Instead, first pulley 314 will remain fixed in position.

The invention further comprises a second pulley supported in the housing to be rotatable with the housing and the mirror frame. Referring to FIG. 15, a second pulley 316 is supported within the housing 310, spaced from the first pulley 314. Second pulley 316 is supported so as to rotate with the housing 310, as mirror frame 124 rotates.

As shown in FIG. 15, first pulley 314 has a first selected diameter d1, and second pulley 316 has a second selected diameter d2. First diameter d1 is larger than second diameter d2. It is preferred that d1 be twice as large as d2, for the reasons explained below.

As broadly embodied herein, the mirror position feedback device comprises a timing belt extending between the two pulleys. Referring to FIG. 15, a timing belt 318 extends between first pulley 314 and second pulley 316.

The invention further comprises a first potentiometer attached to the second pulley and rotatable with the second pulley. As shown in FIG. 15, a first potentiometer 320 is fixed to second pulley 316 via a shaft 322. The first potentiometer 320 calculates the actual amount of mirror rotation based on the amount of rotation of second pulley 316 and the amount of movement of timing belt 318. First potentiometer 320 can rotate a full 360°. The preferred 2:1 ratio of the first pulley diameter d1 to the second pulley diameter d2 means that for every 2° of rotation of second pulley 316 there will be 1° of rotation of the mirror frame 124. The first potentiometer 320 measures the actual rotation.

Alternatively, other means to measure the actual amount of mirror rotation may be used, for example, a mechanism including a lever and a bell-crank attached to the rear face of mirror 126.

A cable projects from the potentiometer and is attachable to a remote means for remotely controlling the mirror. As shown in FIGS. 14 and 15, a cable 324 projects through a grommet 326 and attaches to first potentiometer 320. The other end of cable 324 is connected to processor 100. In this way, the actual degree of mirror rotation measured by the first potentiometer 320 can be fed back to the system, and compared to the desired amount of mirror rotation based on the degree of vehicle turn. The processor 100 then can calculate whether additional mirror rotation is needed to ensure the driver can keep the rear passenger-side corner of the trailer 22 in his field of vision 38. The processor can vary the mirror rotation signal sent to mirror rotation motor 122 accordingly.

The mirror position feedback device described above is not limited for use with the mirror control assembly described herein. A similar mirror position feedback device can be attached to any remotely controlled vehicle mirror assembly.

The invention further comprises a mirror position correction device. The mirror position correction device automatically corrects the mirror position so that the actual mirror position as measured by the mirror position feedback device matches the desired mirror position corresponding to the calculated mirror position as calculated by processor 100.

Figure 16:
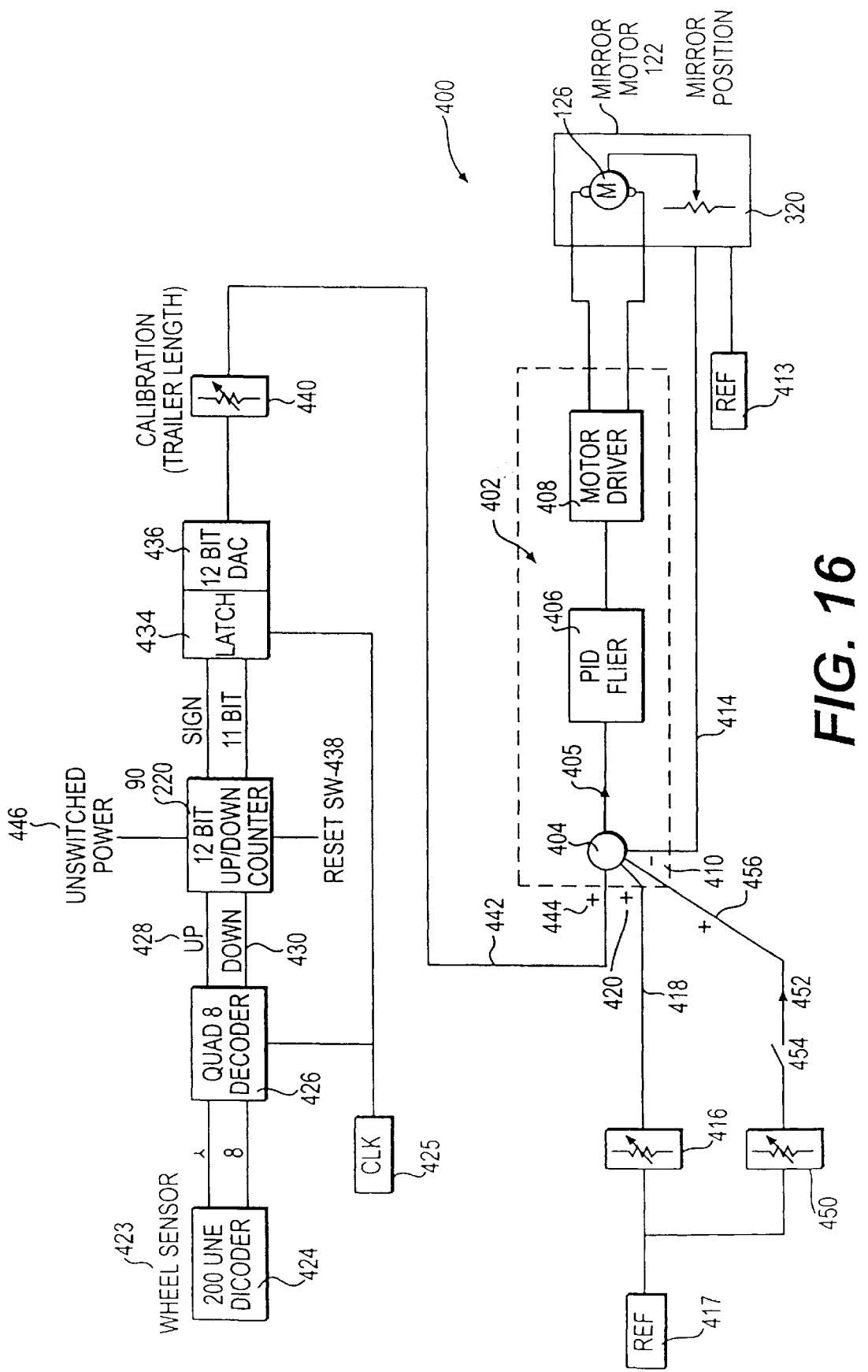
FIG. 16 is a schematic diagram of a mirror position correction device in accordance with the invention.

Particularly and as shown in FIG. 16, counter 90 or counter 220 preferably includes a digital encoder 424 and a digital decoder 426. Control wheel 58 rotates as vehicle 20 makes a turn, and subsequently, via a control wheel sensor 423, drives digital encoder 424 that transmits the electronic pulses to digital decoder 426. For exemplary purposes, the present invention discloses a quadrature encoder and a quadrature decoder but other similar alternatives are acceptable. The quadrature decoder 426, upon receiving a timing pulse from a reference clock 425, generates signals, for example, "up" pulses 428 and "down" pulses 430. "Up" pulses 428 represent increments of trailer 22 movement in a right direction, while "down" pulses 430 represent increments of trailer 22 movement in a left direction with respect to tractor 24. Counter 90 or 220 accumulates counts and presents the current count to a latch 434. Counter 90 or 220 for exemplary purposes, is shown to be a 12-bit up/down counter but, alternatively, any other similar type can be used. The output of latch 434 drives the input to a digital-to-analog converter 436, such as a 12-bit digital-to-analog converter (DAC) which converts the 12-bit count to an analog voltage representing an angular position of trailer 22 with respect to tractor 24. Latch 434 and DAC 436 are preferably located inside processor 100. The vehicle driver may manually reset the 12-bit counter 90 or 220 to zero by engaging a reset switch 438 when vehicle 20 finishes making a turn and returns to a straight position.

As further shown in FIG. 16, a mirror position correction device 400 comprises a controller 402 and a plurality of potentiometers. Controller 402 is preferably a digital controller, for example, a closed loop analog proportional-integral-differential (PID) controller. PID controller 402 further comprises a summing junction 404, a PID filter 406, and a motor driver 408. A mirror motor 122, such as DC gear motor or servo motor, drives mirror face 126. Mirror motor 122 is electronically connected to the first potentiometer 320 such that first potentiometer 320 reacts correspondingly when mirror 126 rotates.

As previously discussed with respect to the mirror position feedback device and as broadly depicted in FIG. 16, a first potentiometer 320 generates a first DC voltage 414 from a reference first voltage 413 that is proportional to an actual position of mirror 126. A second potentiometer 440 generates a second DC voltage 442 that drives mirror motor 122 to the desired mirror position as calculated by processor 100. A third potentiometer 416 generates a third DC voltage 418 from a reference third voltage 417 at a predetermined level corresponding to a preset input when the vehicle driver presets the mirror by adjusting mirror position control 116 on control box 110.

Hence, the first potentiometer 320 corresponds to the actual mirror position, the second potentiometer 440 corresponds to the calculated mirror position, and the third mirror position corresponds to the preset mirror position.

Entering the summing junction 404 are first DC voltage 414 presented to an inverting input 410, second DC voltage 444 presented to a first non-inverting input 444, and third DC voltage 418 presented to a second non-inverting input 420. The logical sum of summing junction 404 is an error signal 405. Error signal 405 is amplified by PID filter 406. PID filter 406 subsequently instructs motor driver 408 to drive mirror 126 in the direction that causes error signal 405 to approach zero. When error signal 405 is zero, motor driver 408 stops running. Thus, the desired and calculated position matches the actual position.

Alternatively, a fourth potentiometer 450, such as a lane scan potentiometer, may be added to summing junction 404. Lane scanning assures the vehicle driver that the traffic environment is safe before making a lane change or a turn. By manually activating a switch, the driver may scan the mirror to view an adjacent lane or lanes to which he or she is attempting to go. Applicant's pending application Ser. No. 08/887,268, which has been allowed, directed to an apparatus and method for vehicle lane scanning and lane changing, is hereby incorporated by reference.

Fourth potentiometer 450 generates a fourth voltage 452 which causes motor 122 to drive mirror 126 to a scanning position setpoint. A switch 454 connects lane scan voltage 452 to a fourth non-inverting input 456 to summing junction 404 which causes motor 122 to drive mirror 126 to a new position represented by the sum of the voltage 442 from the second potentiometer 440, if any, the voltage 418 from the third potentiometer 416, and the voltage 452 from the fourth potentiometer 450. Depending on the vehicle orientation at this point, the voltage 442 from the second potentiometer 440 may or may not carry any load to summing junction 404 at this point. Upon release of switch 454, motor 122 returns to the position represented by the third potentiometer 416. Thus, mirror 126 practically snaps to the position set by the fourth potentiometer 450 and snaps back to its original or home setpoint position as determined by the third potentiometer 416. Only one closure of the switch causes the mirror to rotate in both directions.

Figure 17:
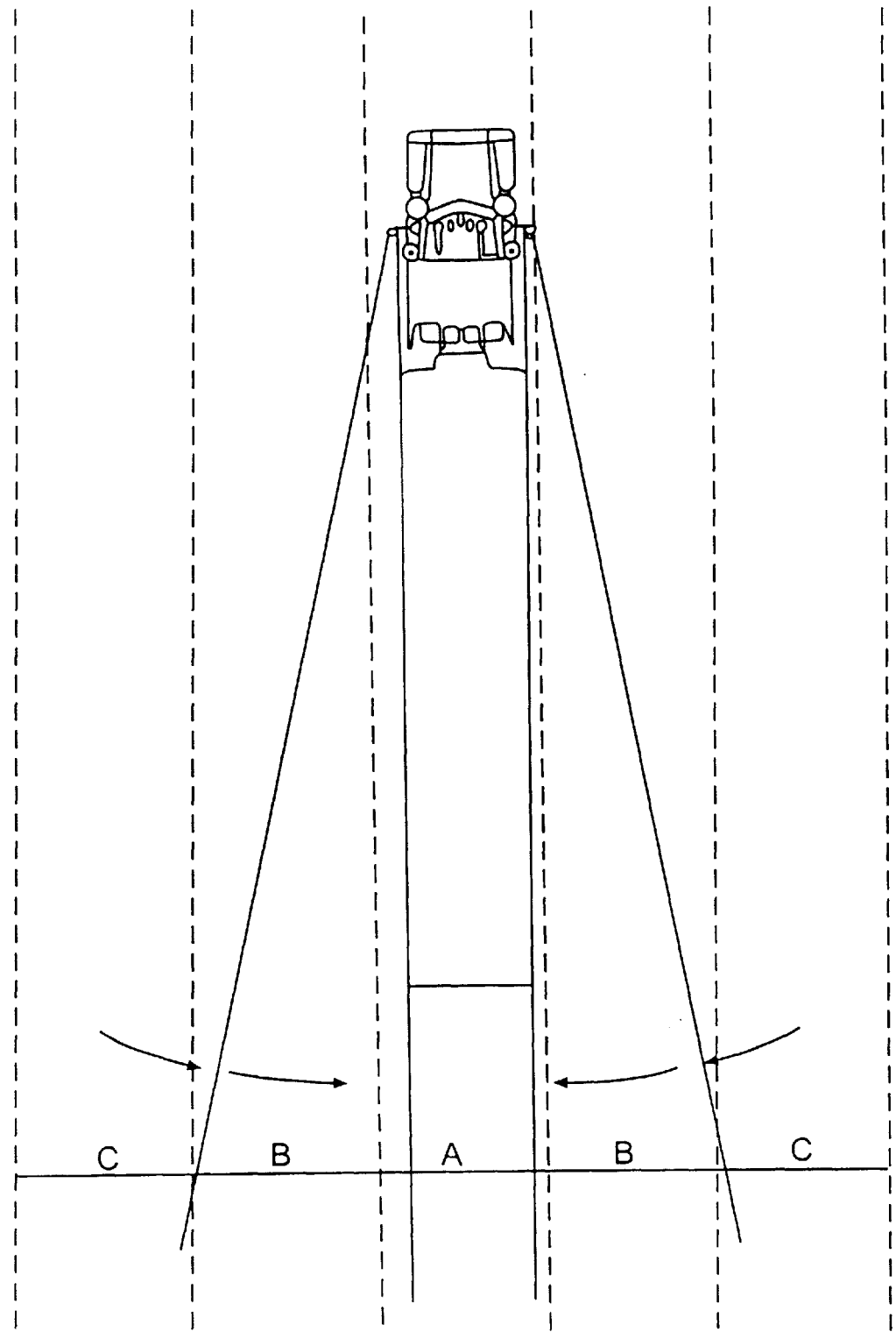
FIG. 17 is a schematic plan view illustrating a set home field of view of left and right hand sideview mirrors of a truck traveling on a five lane highway.
Figure 18:
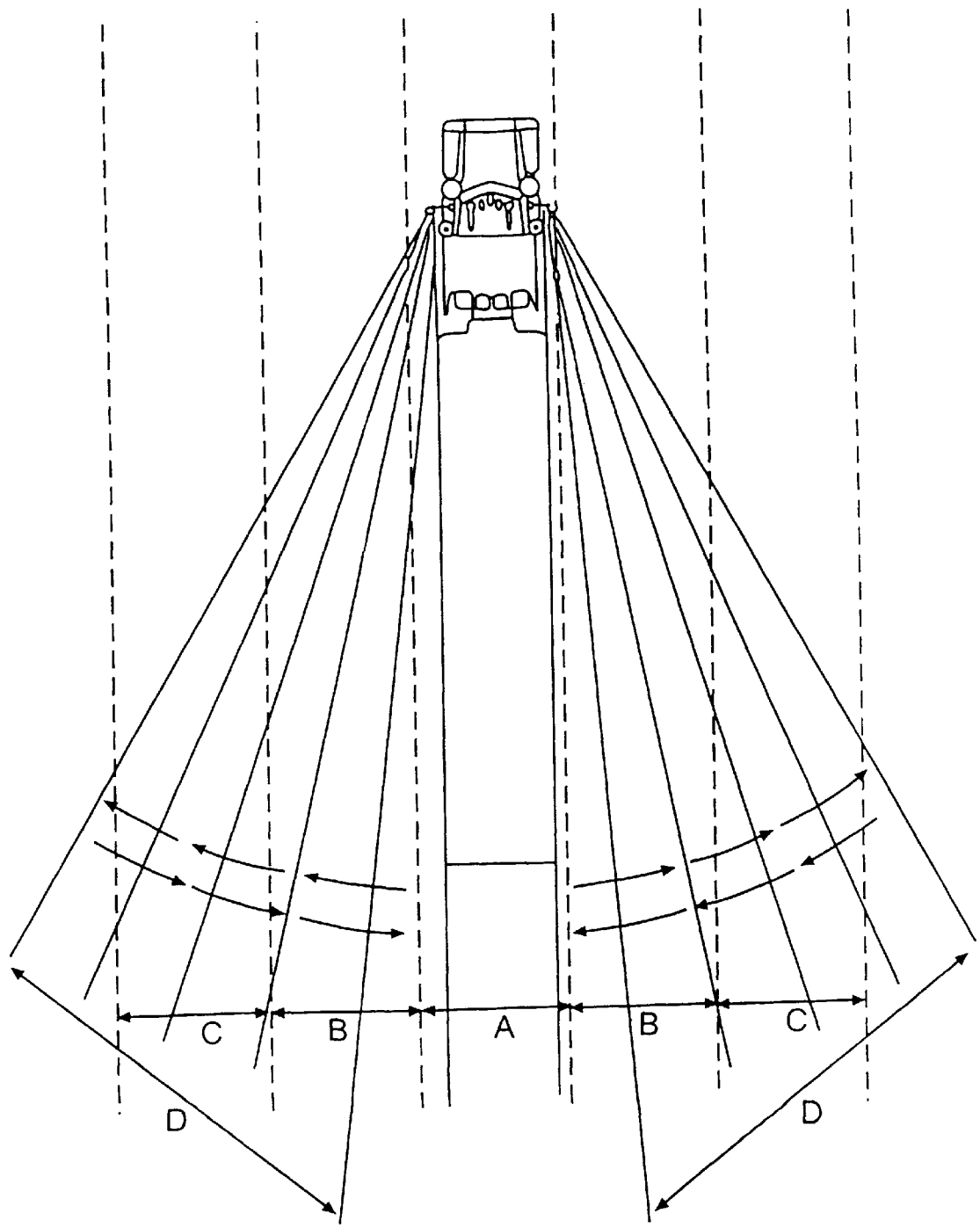
FIG. 18 is a schematic plan view illustrating a typical scanning setpoint field of view of left and right hand sideview mirrors of a truck traveling on a five lane highway.

In operation, as shown in FIGS. 17 and 18, when the driver wishes to change lanes or to make a turn, he or she activates a motor activation switch 454 (shown in FIG. 16) to a first position. The motor activation switch is preferably located inside the cab within reach of the driver. The mirror 126 is rotated to the scanning setpoint position at a rate of speed sufficient to render transparent any view intermediate the home setpoint and the outer or scanned setpoint position of mirror 126 and permit the operator to view a lane of the roadway outwardly spaced from the adjacent lane. By holding switch 454 in the first position, mirror 126 is held in the outer position while the driver determines that all is clear. After determining the safety of the lane change, the driver releases switch 454 and mirror 126 returns to the home setpoint position. While the driver is traveling in lane A, the view seen by the driver when the mirror 126 is in the home setpoint position is area B. When the mirror is rotated to the scanning setpoint position, the view seen by the driver is area C. The speed of rotation of mirror 126 is such that the area D between the areas B and C during rotation of the mirror is not seen by the driver.

In operation, when vehicle 20 makes a right turn, counter 90 or 220 determines that the most significant bit of the 12-bit count is positive. Latch 434 will update the input to DAC 436 and the DAC 436 output voltage will positively increase in proportion to the angle of trailer 22 with respect to tractor 24. When vehicle 20 makes a left turn, however, counter 90 or 220 determines that the most significant bit of the 12-bit count is negative. Latch 434 is prevented from updating the input to DAC 436 and the output of DAC 436 is held at the reset value which is zero. Therefore, a left turn does not result in a negative increase in DAC output voltage.

The output of DAC 436 is attenuated by the second potentiometer 440. Second potentiometer 440 generates a second DC voltage 442 presented to the first non-inverting input 444 of a summing junction 404. Second DC voltage 442 causes motor driver 408 to drive mirror motor 122 inside mirror assembly 34 to a new position represented by the sum of second DC voltage 442 and a third DC voltage 418 from a third potentiometer 416. Second DC voltage 442 is proportional to the angle that trailer 22 makes with tractor 24 as the tractor-trailer makes a turn. Second DC voltage 442 drives mirror face 126 to a new position that keeps the rear end of trailer 22 in the field of vision 38. A longer trailer 22 requires greater mirror movement for a given turn angle. Therefore, the vehicle driver can compensate for a given length of trailer 22 by adjusting second potentiometer 440. In addition, the 12-bit counter 432 may be connected to a memory 446, such as an unswitched power, so that the count representing the current trailer position is not lost if the mirror system is powered off.

The present invention operates as follows. In the first embodiment, when the trailer 22 is engaged with tractor 24, coil spring 210 biases slider block 206 upward in groove 204 until control wheel 58 engages with the bottom surface of trailer 22. The driver then enters the cab, energizes the system, sets his mirrors and calibrates the system as described above.

In the second embodiment, after hooking up trailer 22 to fifth wheel 26, the driver manually sets support 40 to the proper position front to rear on chassis 30, and tightens down bolts 46. Entering the cab, the driver energizes the system with switch 112, sets the desired position of mirror assembly 34 with mirror positioning switch 116, and calibrates the system with calibration switch 118 by setting in the length of the trailer. Typically, the mirror position is set along an axis generally parallel with axis 32 defined by the tractor and trailer, thereby providing the driver with a view of the rear passenger-side corner 36 of the trailer. After the system is energized with switch 112, the pneumatic cylinder is activated with switch 113. Solenoid-operated valve 72 opens and fluid pressure is provided via fluid line 70 to cylinder 62. Piston arm 66 retracts, pulling control arm 50 from disengaged position 80 to engaged position 82, with wheel 58 in rolling contact with the underside of trailer 22, along a line transverse to axis 32 defined by tractor 24 and trailer 22.

In both embodiments, when the driver turns the vehicle, trailer 22 pivots with respect to tractor 24 about pivot point 26. As trailer 22 pivots, control wheel 58 turns. The corresponding wheel rotations or partial rotations in the form of electronic pulses are counted by electronic counter 90 or by electronic counter 220. Electronic pulses then are transmitted to processor 100.

Processor 100 calculates a degree of vehicle turn corresponding to the counted rotations or partial rotations of control wheel 58. Already knowing the position of mirror assembly 34 and the length of trailer 22, processor 100 calculates a degree of mirror rotation corresponding to the degree of vehicle turn necessary to maintain the rear passenger corner of the trailer in the mirror's field of vision 38.

Figure 1B:
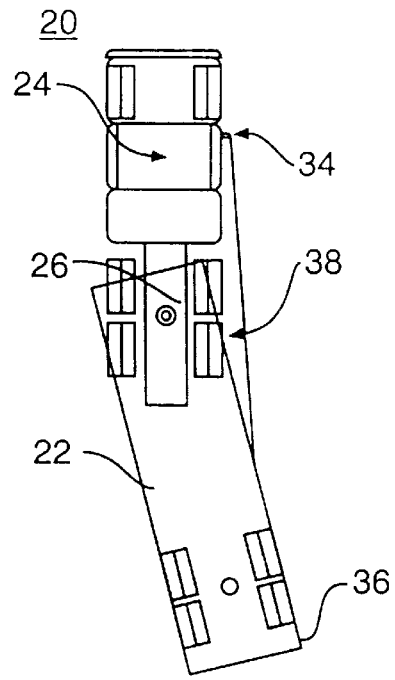
FIG. 1(b) is a top view of a tractor and semi-detached trailer of the prior art, in which the field of vision in the passenger-side rear view mirror is reduced or eliminated during a vehicle turn.
Figure 1C:
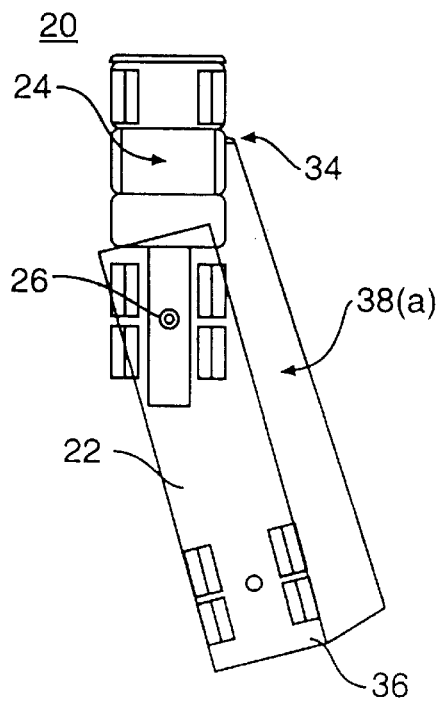
FIG. 1(c) is a top view of a tractor and semi-detached trailer including an automatically adjustable rear view mirror assembly according to the present invention, in which the driver retains the field of vision in the passenger-side rear view mirror during a vehicle turn.

Processor 100, via second potentiometer 440, transmits a calculated mirror position signal corresponding to the calculated degree of mirror rotation to motor 122. Motor 122 rotates mirror face 126 in order to establish a field of vision 38(*a*) as shown in FIG. 1(*c*). The first potentiometer 320 in a mirror position feedback device determines an actual mirror position. A mirror position correction device compares three inputs, namely, the actual mirror position from the mirror position feedback device, the calculated desired degree of mirror rotation from processor 100, and the preset mirror position as entered by the driver by presetting the third potentiometer 416. The mirror position correction device then automatically corrects the mirror position when the actual mirror position differs from the desired and calculated mirror position.

Likewise, when trailer 22 pivots back into alignment with tractor 24 at the end of the turn, wheel 58 rolls, resulting in a signal to rotate the mirror back to the original position, restoring original field of vision 38.

In a related feature of this invention, oftentimes the mirror assembly accidentally gets bumped or hit out of position. Mirror position correction device 400 will automatically correct mirror face 126 to return to a home position as originally set by the driver. FIG. 16 illustrates this case. The actual mirror position as measured by first potentiometer 320 will be different from the mirror position as initially pre-set by third potentiometer 416 as entered by the driver. If the vehicle is not in the process of making a turn, second potentiometer 440 likely will not play a major role here. Summing junction 404 receives first and second DC voltages 414 and 418, respectively, and third DC voltage 442, if any, and measures a logical sum to indicate error signal 405. Error signal 405 is amplified by PID filter 406. PID filter 406 then instructs motor driver 408 to drive mirror face 126 in the direction that causes error signal 405 to approach zero. When error signal 405 reads zero, motor driver 408 stops running. Thus, the pre-set position, including the calculated position, if any, match the actual position.

In this manner, the driver can always see the rear passenger-side corner of the trailer, even during a vehicle turn. Moreover, in the first embodiment, springs 210 keep slider block 206 biased upward and wheel 58 in contact with the trailer despite jolts caused by road irregularities. Likewise, in the second embodiment, because regulator 86 maintains constant pressure in cylinder 62 as the trailer moves up and down, wheel 58 is kept in substantially continuous contact with the underside of trailer 22, even on rough roads. Preferably, when limit switch 115 is provided, the driver has continuous positive indication at control box 110 when wheel 58 is engaging the underside of trailer 22.

Modifications can be made to the above-described invention. For example, the presence of ice, slush, and salt on roads in northern climates can interfere with the operation of wheel 58, and the various control wheel support mechanisms. In order to protect these components from the external environment, a detachable or permanent protective housing 120 (depicted broadly in FIG. 3) can be provided. Likewise, additional structures can be provided that are capable of rotatably supporting control wheel 58, bringing control wheel 58 into contact with the underside of trailer 22, and moving control wheel 58 away from trailer 22 at desired times. The interchangeability of signal transmitting devices between counter and processor, and between processor and DC motor or servo-motor, also has been discussed. The system can be provided with a DC motor or a servo-motor to connect to an existing mirror assembly, or can be provided with its own rotatable mirror assembly to mount on the tractor. The mirror assembly itself can include a single mirror face, or a plurality of interchangeable mirror faces with varying optical characteristics. A separate power source and/or pressurized fluid source can be provided, or the system can operate from the vehicle's electrical system and/or high pressure air system. The control panel 110 also can be configured to enable the driver to deenergize the automatic mirror rotation capability and take direct control of mirror rotation.

Additionally, although the invention has been described with respect to a passenger-side mirror on the right-hand side of the vehicle, it can also be configured to work with the driver's-side mirror assembly, or with a passenger-side mirror on the left-hand side of the vehicle for use in countries where drivers drive on the right side of the road.

Additional modifications readily will occur to those skilled in the art. For example, in order to work with trailers lacking a smooth underside surface, e.g., fuel tankers, car carriers, or ten and twenty-yard dirt haulers, a flat steel plate can be mounted on the front end trailer underside for wheel 58 to roll against. Such modifications are well within the skill level of persons of ordinary skill.

The invention in its broader aspects, therefore, is not limited to the specific details and embodiments described above or shown in the drawings. Departures may be made from such details without departing from the spirit or scope of the invention.

I claim:

1. A mirror position feedback and correction assembly for a vehicle having a tractor, a pivotally connected semi-detached trailer, and a rotatable powered mirror assembly mounted on the tractor, the mirror assembly having a mirror, a mirror face, a fixed shaft, a frame, and a housing attachable to the frame such that the fixed shaft projects through the housing, the mirror position feedback and correction assembly for use in combination with a counting means for determining a trailer rotation with respect to the tractor and a control means for calculating a desired mirror rotation corresponding to the trailer rotation and generating a calculated mirror position signal, the assembly comprising:

a mirror position feedback device for determining an actual mirror position and for generating an actual mirror position signal indicating the actual mirror position, the mirror position feedback device comprising:

a sensing means for sensing an actual rotation of the mirror, the sensing means including a first potentiometer rotatable in an amount proportional to the actual rotation of the mirror, the sensing means comprising a pair of pulleys supported in the housing, a first pulley being fixedly attachable to the fixed shaft, and a second pulley to be rotatable with a component of the mirror assembly and a timing belt extending between the pair of pulleys, wherein the first potentiometer is attached to and rotatable with the second pulley for measuring the actual rotation of the mirror and for generating the actual mirror position signal; and transmitting means for transmitting the amount of actual mirror rotation to the control means for controlling the mirror; and a mirror position correction device for comparing the actual mirror position signal from the mirror position feedback device to the calculated mirror position signal indicating a desired mirror position from the control means, and for correcting the mirror position when the actual mirror position signal differs from the calculated mirror position signal.

2. The assembly of claim 1, wherein the mirror position correction device comprises:

a controller for positioning the mirror; and a second potentiometer connectable to the controller and the mirror, for generating the calculated mirror position signal and for driving the mirror to the desired mirror position;

wherein the controller compares the actual mirror position signal to the calculated mirror position signal, and generates a signal to drive the mirror to the desired mirror position when the actual mirror position signal differs from the calculated mirror position signal.

3. The assembly of claim 2, wherein the mirror position correction device further comprises:

a third potentiometer connectable to the controller and the mirror, for presetting a mirror position, for generating a preset mirror position signal, and for driving the mirror to a preset mirror position;

wherein the controller compares the preset mirror position signal and the calculated mirror position signal to the actual mirror position signal, and generates the signal to drive the mirror to the desired mirror position.

4. The assembly of claim 3, wherein the controller comprises a proportional-integral-differential controller having:

a summing junction for receiving the actual mirror position signal, the calculated mirror position signal, and the preset mirror position signal, and for generating an error signal at times when the calculated mirror position signal and the preset mirror position signal differ from the actual mirror position signal;

a proportional-integral-differential filter for amplifying the error signal; and a motor driver for driving the mirror in a direction reducing the error signal to zero.

5. The assembly of claim 1, further comprising:

a lane scan device for viewing an area of multilane roadway alongside the vehicle, the lane scan device comprising:

an activation switch operable to a first condition when in a second condition, and operable to the second condition when in the first condition; and a controller responsive to the operation of the activation switch to the first condition for rotating the mirror in a first direction through a path starting from a home position to a scanning setpoint position, and responsive to the operation of the switch to the second condition following a manual operation to the first condition to rotate the mirror in a second condition from the scanning setpoint position to the home position.

* * * * *